3,066,129
PRODUCTION OF RUBBERY POLYMERS WITH A LITHIUM ALUMINUM HYDRIDE-TITANIUM CHLORIDE-IODINE CATALYST
Ralph C. Farrar, Bartlesville, Okla., assignor to Phillips Petroleum Company, a corporation of Delaware
No Drawing. Filed July 15, 1960, Ser. No. 42,978
9 Claims. (Cl. 260—94.3)

This invention relates to a process for polymerizing 1,3-butadiene or isoprene and to a novel catalyst composition therefor. In one aspect, the invention relates to a process for polymerizing 1,3-butadiene or isoprene so as to obtain a polymer containing a high percentage of trans 1,4-addition.

In recent years, there has been considerable activity in the development of processes for producing olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a certain configuration, has aroused a great deal of interest. The polymer so formed by use of these catalysts, particularly the butadiene and isoprene polymers, often have outstanding physical properties which render them equal to or even superior to natural rubbers. As a result, the synthetic rubbers are in many applications supplementing, or even replacing, natural rubbers. For example, trans 1,4-polybutadiene prepared with stereospecific catalyst has been found to be an excellent substitute for balata or gutta-percha.

It is an object of this invention to provide a novel process for polymerizing 1,3-butadiene or isoprene.

Another object of the invention is to provide a novel catalyst system which directs the polymerization of 1,3-butadiene or isoprene so that the resulting polymer is formed primarily by trans 1,4-addition.

Other and further objects and advantages of the invention will become apparent to those skilled in the art upon consideration of the accompanying disclosure.

Broadly speaking, the process of this invention comprises the step of contacting 1,3-butadiene or isoprene with a catalyst comprising lithium aluminum hydride, a chloride of titanium and elemental iodine. The titanium chlorides employed in the catalyst system include the di-, tri- and tetrachlorides. When utilizing this catalyst system to polymerize 1,3-butadiene or isoprene, a polymer containing from 70 to 90 percent and higher trans-1,4-addition is obtained in very high conversion. It has previously been proposed to polymerize 1,3-butadiene with a catalyst comprising lithium aluminum hydride and titanium tetrachloride. The polymer product of this latter process is formed primarily by 1,2-addition of the butadiene. It has also been observed that the conversions are frequently low except when high catalyst levels are utilized. It was completely unexpected, therefore, where it was found that the addition of a small amount of iodine to a catalyst comprising lithium aluminum hydride and a titanium chloride directed the polymerization of butadiene from 1,2-addition to trans-1,4-addition of the monomer units.

The amount of lithium aluminum hydride used in the catalyst composition of this invention is usually in the range of 0.5 to 5 moles per mole of the titanium chloride. However, it is to be understood that amounts outside of the aforementioned range can be utilized. The mole ratio of iodine to lithium aluminum hydride and titanium chloride is usually in the range of 0.1:1 to 1:1 although slightly larger amounts can be used if desired. The amount of the total catalyst system used, including the lithium aluminum hydride, the titanium chloride and elemental iodine, can vary over a rather wide range. However, the amount is generally in the range of 0.20 to 10.0, preferably between 0.25 and 4.0, weight percent, based on the amount of monomer charged to the reaction.

The polymerization process of this invention is usually carried out in the presence of a diluent. Diluents suitable for use in the process are hydrocarbons which are substantially inert and non-detrimental to the polymerization reaction. Suitable diluents include aromatics, such as benzene, toluene, xylene, ethylbenzene, and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Mixtures of these paraffinic hydrocarbons can also be employed as diluents in carrying out the process of this invention. Cycloparaffins, such as cyclohexane and methylcyclohexane, can also be used. Furthermore, mixtures of any of the aforementioned hydrocarbons can be used as diluents. It is usually preferred to carry out the polymerization by utilizing from 1 to 10 volumes of diluent per volume of monomer. However, greater or lesser amounts can be used without departing from the spirit and scope of the invention.

The polymerization process of this invention can be carried out at temperatures varying over a relatively wide range, e.g., from 0 to 150° C. However, it is usually preferred to operate at a temperature in the range of 10 to 80° C. The polymerization reaction can be carried out under autogenous pressure or at any suitable pressure sufficient to maintain the reaction mixture substantially in the liquid phase. The pressure will thus depend upon the particular diluent being employed and the temperature at which the polymerization is conducted. However, higher pressures can be used if desired, these pressures being obtained by some such suitable method as the pressurization of the reactor with a gas which is inert with respect to the polymerization reaction.

The process of this invention can be carried out as a batch process by charging the monomer to a reactor containing catalyst and diluent. Although any suitable charging procedure can be used, it is usually preferred to add the catalyst components to a reactor containing diluent and thereafter introducing the monomer. The lithium aluminum hydride is charged to the reactor as an ether solution. Ethers suitable for preparing the solutions include dialkyl ethers. Examples of such ethers include dimethyl ether, diethyl ether, di-n-propyl ether, diisopropyl ether, di-n-butyl ether, diamyl ether, methyl ethyl ether, methyl isopropyl ether, ethyl amyl ether, and the like. The titanium chloride can be charged to the reactor directly without being dissolved in a solvent. However, it is within the scope of the invention to charge the titanium chloride as a solution in a hydrocarbon. The elemental iodine is preferably introduced as a solution in a hydrocarbon, preferably an aromatic hydrocarbon such as benzene or toluene. It is also within the scope of the invention to preform the catalyst by reacting the catalyst ingredients within a separate catalyst preparation vessel. The resulting reaction product can then be charged to the reactor containing monomer and diluent, or these latter materials can be added after the catalyst. The process can also be carried out continuously by maintaining the above-mentioned concentrations of reactants in the reactor for a suitable residence time. The residence time in a continuous process will, of course, vary within rather wide limits, depending upon such variables as temperature, pressure, the ratio of catalyst components and the catalyst concentrations. In a continuous process, the residence time will usually fall within the range of one second to one hour when conditions within the specified ranges are employed. When a batch process is being utilized, the time for the reaction can be high as 24 hours or more.

Various materials are known to be detrimental to the catalyst composition of this invention. These materials include carbon dioxide, oxygen and water. It is usually desirable, therefore, that the monomer be free of these materials as well as other materials which may tend to inactivate the catalyst. Any of the known means for removing such contaminants can be used. Furthermore, when a diluent is employed in the process, it is preferred that this material be substantially free of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalysts-inactivating materials can be tolerated in the reaction mixture. However, it is also to be understood that the amount of such material which can be tolerated is insufficient to cause complete deactivation of the catalyst.

Upon completion of the polymerization reaction, when a batch process is used, the total reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to recovery of the polymer. After addition of the catalyst-inactivating material and the antioxidant, the polymer present in the solution can then be separated by the addition of an excess of a material such as ethyl alcohol or isopropyl alcohol. When the process is carried out continuously, the total effluent from the reactor can be pumped from the reactor to a catalyst-inactivating zone wherein the reactor effluent is contacted with a catalyst-inactivating material, such as an alcohol. When an alcohol is used as the catalyst-inactivating material, it also functions to precipitate the polymer. In the event catalyst-inactivating materials are employed which do not perform this dual role, a suitable material, such as an alcohol, can then be added to precipitate the polymer. It is, of course, to be realized that it is within the scope of the invention to employ other suitable means to recover the polymer from the solution. After separation from the water or alcohol and diluent by filtration or other suitable means, the polymer is then dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents, and fillers such as have been employed in natural rubber can likewise be used when compounding the product of this invention.

A more comprehensive understanding of the invention can be obtained by referring to following illustrative examples, which are not intended, however, to be unduly limitative of the invention.

Examples of certain of the polymer products produced in the runs described in the examples were examined in infrared analysis. This work was carried out in order to determine the percentage of the polymer formed by trans-1,4-addition, 1,2-addition, and cis-1,4-addition of the butadiene. The procedure described hereinafter was employed in making these determinations.

The polymer samples were dissolved in carbon disulfide to form a solution having 25 grams of polymer per liter of solution. The infrared spectrum of each of the solutions (percent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-mole$^{-1}$-centimeters$^{-1}$); $E$=extinction (log $I_0/I$; $t$=path length (centimeters; and $c$=concentration (moles double bond/liter). The extinction was determined at the 10.35 micron band and the extinction coefficient was 146 (liters-moles$^{-1}$-centimeters$^{-1}$).

The percent of the total unsaturation as 1,2-(or vinyl) was calculated according to the above equation, using the 11.0 micron band and an extinction coefficient of 209 (liters-moles$^{-1}$-centimeters$^{-1}$).

The percent of the total unsaturation present as cis 1,4- was obtained by subtracting the trans 1,4- and 1,2- (vinyl) determined according to the above procedures from the theoretical unsaturation, assuming one double bond per each $C_4$ unit in the polymer.

EXAMPLE I

A run was carried out in which 1,3-butadiene was polymerized according to the process of this invention. The following polymerization recipe was used in this run:

|  | Parts |
|---|---|
| Butadiene | 100 |
| Cyclohexane | 780 |
| Titanium tetrachloride (TTC) | 0.313 (1.65 mm.) |
| Lithium aluminum hydride (LiAlH$_4$) | 0.0626 (1.65 mm.) |
| Iodine (as I$_2$) | 0.254 (1.00 mm.) |
| LiAlH$_4$/TTC | 1:1 |
| I$_2$LiAlH$_4$-TTC | 0.3:1 |
| Catalyst age at 30° C., min | 3 |
| Temperature, ° C | 50 |
| Time, hrs | 21 |

The cyclohexane was charged to a reactor which was then purged with dry nitrogen. Thereafter, the lithium aluminum hydride was added as a solution in diethyl ether (0.254 molar). The iodine was then added as a solution in toluene (0.077 molar), followed by the titanium tetrachloride. The butadiene was then charged to the reactor, and the temperature was elevated to 50° C. and maintained at that level for 21 hours. At the end of this period, the polymer was coagulated by adding isopropanol. The coagulated polymer was isolated, washed, and dried. Conversion was 86 percent, and the inherent viscosity of the polymer was 1.76. The polymer contained 80.6 percent trans 1,4-addition, 2.1 percent 1,2-addition and 17.3 cis 1,4-addition.

This example shows that polymerization of butadiene in the presence of a lithium aluminum hydride-titanium tetrachloride catalyst system to which there was added a small amount of elemental iodine yielded a polymer containing a high percentage of trans 1,4-addition and only a small percentage of 1,2-addition.

EXAMPLE II

Several runs were carried out in which 1,3-butadiene was polymerized with a catalyst consisting of lithium aluminum hydride and titanium trichloride. In certain of the runs iodine was added to the aforementioned materials prior to charging of the monomer. The recipe employed in the runs was as follows:

|  | Parts |
|---|---|
| Butadiene | 100 |
| Cyclohexane | 780 |
| Lithium aluminum hydride | 0.0626 (1.65 mm.) |
| Titanium trichloride | Variable |
| Iodine | Variable |
| Catalyst age at 30° C., min | 3 |
| Temperature, °C | 50 |
| Time, hrs | Variable |

In each of these runs, the cyclohexane was charged to the reactor which was then purged with nitrogen. The titanium trichloride was then charged, followed by the iodine, when used, as a 0.077 molar solution in toluene and the lithium aluminum hydride as a 0.254 molar solution in diethyl ether. The butadiene was then charged, and the temperature elevated to and maintained at 50° C. until the end of the reaction period. Recovery of the polymer was as described in Example I. Data for these runs are shown hereinafter in Table I.

This example shows that at the same approximate levels and ratios of lithium aluminum hydride and titanium trichloride, the inclusion of iodine in the catalyst system increases activity of the catalyst. Also that when iodine is included, high trans-unsaturation is realized with but very little vinyl unsaturation.

This example shows that the incorporation of iodine in the lithium aluminum hydride-titanium trichloride system improved the yield and provided a high trans-content polymer. In the absence of the iodine the product had the appearance of a vinyl polymer.

The rubbery polymers produced in accordance with this invention have utility in applications where natural and synthetic rubbers are used. They can be used in the manufacture of automobile tires and other rubber articles, such as gaskets, tubing, covering for wiring cable, rubber heels, rubber tile and golf balls.

As will be evident to those skilled in the art, many variations and modifications of this invention can be practiced in view of the foregoing disclosure. Such variations and modifications are clearly believed to come within the spirit and scope of the invention.

I claim:

1. A method for polymerizing a monomer selected from the group consisting of 1,3-butadiene and isoprene which comprises contacting said monomer under polymerization conditions with a catalyst consisting essentially of (a) an ether solution of lithium aluminum hydride, (b) a titanium chloride selected from the group consisting of di-, tri- and tetrachlorides of titanium, and (c) iodine.

2. A method according to claim 1 wherein said catalyst consists essentially of an ether solution of lithium aluminum hydride, titanium tetrachloride, and iodine.

3. A method according to claim 1 wherein said cata-

*Table I*

| Run No. | TiCl$_3$ | | LiAlH$_4$ | | Mol Ratio, LiAlH$_4$/TiCl$_3$ | Iodine | | Mol Ratio, I$_2$/LiAlH$_4$-TiCl$_3$ | Time, hrs. | Conv., percent | trans, percent | Vinyl, percent | cis, percent | Inherent Viscosity |
|---|---|---|---|---|---|---|---|---|---|---|---|---|---|---|
|  | Parts | mm. | Parts | mm. |  | Parts | mm. |  |  |  |  |  |  |  |
| 1 | 0.0860 | 0.558 | 0.0626 | 1.65 | 2.93/1 | 0 | 0 |  | 168 | 0 |  |  |  |  |
| 2 | 0.1020 | 0.662 | 0.0626 | 1.65 | 2.49/1 | 0 | 0 |  | 168 | 0 |  |  |  |  |
| 3 | 0.1560 | 1.012 | 0.0626 | 1.65 | 1.63/1 | 0 | 0 |  | 168 | 0 |  |  |  |  |
| 4 | 0.2490 | 1.616 | 0.0626 | 1.65 | 1.023/1 | 0 | 0 |  | 168 | 0 |  |  |  |  |
| 6 | 0.1120 | 0.727 | 0.0626 | 1.65 | 2.27/1 | 0.254 | 1.00 | 0.42 | 28.5 | 93 |  |  |  | 6.82 |
| 7 | 0.1470 | 0.954 | 0.0626 | 1.65 | 1.73/1 | 0.254 | 1.00 | 0.39/1 | 28.5 | 90 |  |  |  | 6.57 |
| 8 | 0.2530 | 1.640 | 0.0626 | 1.65 | 1.005/1 | 0.254 | 1.00 | 0.30/1 | 28.5 | 93 | 81.6 | 2.1 | 16.3 | 5.06 |

EXAMPLE III

Two runs were carried out in which 1,3-butadiene was polymerized in the presence of lithium aluminum hydride and titanium trichloride, elemental iodine being added in one run and omitted in the other. The recipe employed was as shown below:

|  | Parts |
|---|---|
| Butadiene | 100 |
| Cyclohexane | 780 |
| Lithium aluminum hydride | Variable |
| Titanium trichloride | Variable |
| Iodine | Variable |
| Catalyst age at 30° C., min | 2 |
| Temperature, °C | 50 |
| Time, hrs | 18.5 |

The cyclohexane was charged to the reactor which was then purged with nitrogen. The titanium trichloride was then charged, followed by the iodine, when used, as a 0.077 molar solution in toluene and the lithium aluminum hydride as a 0.254 molar solution in diethyl ether. The butadiene was then charged, and the temperature elevated to 50° C. at which level it was maintained for 18.5 hours. Coagulation and recovery of the polymer were carried out as previously described. Data for these runs are shown hereinafter in Table II.

lyst consists essentially of an ether solution of lithium aluminum hydride, titanium trichloride, and iodine.

4. A method for polymerizing a monomer selected from the group consisting of 1,3-butadiene and isoprene which comprises contacting said monomer with a catalyst formed from materials consisting essentially of (a) a solution of lithium aluminum hydride in a dialkyl ether, (b) a titanium chloride selected from the group consisting of di-, tri- and tetrachlorides of titanium, and (c) iodine, said contacting occurring in the presence of a hydrocarbon diluent at a temperature in the range of 0 to 150° C. and at a pressure sufficient to maintain said diluent in liquid phase; and recovering the polymer so produced.

5. The method according to claim 4 wherein the mole ratio of said lithium aluminum hydride to titanium chloride is in the range of 0.5 to 5.0 and the mole ratio of iodine to said lithium aluminum hydride and titanium chloride is in the range of 0.1:1 to 1:1.

6. A method for producing a rubbery polymer of 1,3-butadiene containing a high percentage of trans 1,4-addition which comprises contacting said 1,3-butadiene with a catalyst consisting essentially of a solution of lithium aluminum hydride in a dialkyl ether, titanium tetrachloride, and iodine, said contacting occurring in

*Table II*

| Run No. | TiCl$_3$ | | LiAlH$_4$ | | Mol Ratio, LiAlH$_4$/TiCl$_3$ | Iodine | | Mol Ratio, I$_2$/LiAlH$_4$-TiCl$_3$ | Time, hrs. | Conv., percent | trans, percent | Vinyl, percent | cis, percent |
|---|---|---|---|---|---|---|---|---|---|---|---|---|---|
|  | Parts | mm. | Parts | mm. |  | Parts | mm. |  |  |  |  |  |  |
| 1 | 0.485 | 3.14 | 0.119 | 3.14 | 1/1 | 0 | 0 |  | 18.5 | 3 | (¹) | (¹) | (¹) |
| 2 | 0.417 | 2.70 | 0.114 | 3.00 | 1.11/1 | 0.508 | 2.00 | 0.35/1 | 18.5 | 85 | 88.3 | 2.6 | 9.1 |

¹ This sample had the appearance of normal 60 to 70 percent vinyl polymers as usually obtained with the lithium aluminum hydride-titanium tetrachloride catalyst. The polymer was difficult to dissolve.

the presence of a hydrocarbon diluent under autogenous pressure and at a temperature in the range of 10 to 80° C., the mole ratio of said lithium aluminum hydride to titanium tetrachloride being in the range of 0.5 to 5.0 and the mole ratio of said iodine to said lithium aluminum hydride and titanium tetrachloride being in the range of 0.1:1 to 1:1; and recovering the rubbery polymer so produced.

7. A catalyst composition consisting essentially of (a) an ether solution of lithium aluminum hydride, (b) a titanium chloride selected from the group consisting of di-, tri- and tetrachlorides of titanium, and (c) iodine.

8. A catalyst composition consisting essentially of an ether solution of lithium aluminum hydride, titanium tetrachloride, and iodine.

9. A catalyst composition consisting essentially of an ether solution of lithium aluminum hydride, titanium trichloride, and iodine.

References Cited in the file of this patent

UNITED STATES PATENTS

| | | |
|---|---|---|
| 2,846,427 | Findlay | Aug. 5, 1958 |

FOREIGN PATENTS

| | | |
|---|---|---|
| 551,851 | Belgium | Apr. 17, 1957 |
| 552,578 | Belgium | May 14, 1957 |
| 776,326 | Great Britain | June 5, 1957 |